Aug. 3, 1965 L. R. MILLSAP 3,198,961
QUANTIZER PRODUCING DIGITAL-OUTPUT WHOSE POLARITY AND REPETITION-RATE ARE RESPECTIVELY DETERMINED BY PHASE AND AMPLITUDE OF ANALOG-INPUT
Filed June 26, 1962
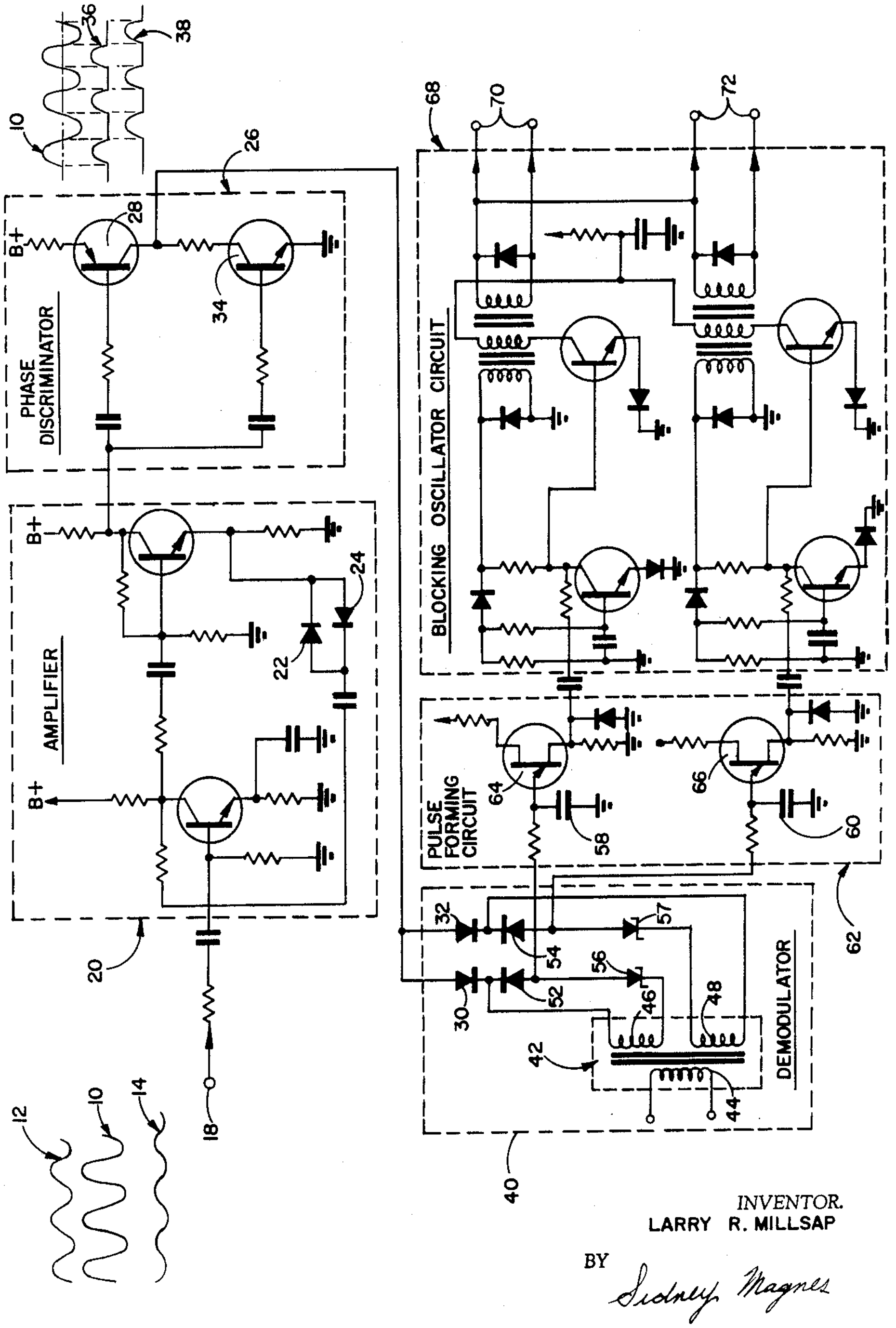
INVENTOR.
LARRY R. MILLSAP
BY Sidney Magnes
AGENT United States Patent Office 3,198,961
Patented Aug. 3, 1965

3,198,961

QUANTIZER PRODUCING DIGITAL-OUTPUT WHOSE POLARITY AND REPETITION-RATE ARE RESPECTIVELY DETERMINED BY PHASE AND AMPLITUDE BY ANALOG-INPUT

Larry R. Millsap, Anaheim, Calif., assignor to North American Aviation, Inc.

Filed June 26, 1962, Ser. No. 205,348
11 Claims. (Cl. 307—88.5)

This invention relates to circuitry that converts analog signals of the carrier-suppressed modulated type into digital signals; and more particularly to circuitry wherein (1) the phase of the analog signal determines whether the digital signal is positive or negative, and (2) the amplitude of the envelope of the analog signal determines the repetition rate of the digital signal.

*Background*

In many cases, devices produce output signals of the type that varies in amplitude. For example, when the level of gasoline in an automobile's gas tank varies, an electrical signal changes amplitude, which change of amplitude is noted on a dashboard meter. In other cases the amplitude of the output signal will vary with temperature, pressure, etc., or with the deviation from a predetermined value.

An electrical signal that changes amplitude in this way is known as an "analog" signal.

When a carrier signal whose frequency is substantially higher than the highest frequency components of the analog signal is modulated by the analog signal and the carrier frequency is suppresed or eliminated, a "carrier-suppressed modulated" signal is obtained in which the phase of the signal is a measure of the polarity of the analog signal and the amplitude of the envelope of the signal is a measure of the amplitude of the analog signal.

When it is desired to feed these analog signals into other devices, such as computers, it becomes necessary to convert the amplitude-varying analog signals into a series of pulses known as "digital" signals. Often the frequency of recurrence of the pulses indicates one of the characteristics, such as the amplitude of the analog signal; while the polarity of the pulses indicates another characteristic, i.e., whether the analog signal is increasing or decreasing.

Frequently, pulses of different polarity appear at different output terminals, so that the terminal at which the pulses appear can indicate a characteristic.

Converting circuits or devices of this type are frequently called "quantizers," since they convert an input signal of continuously varying amplitude into pulses having discrete steps, or "quantities."

Many analog-to-digital converters have previously been designed; but most of them either use mechanical devices—which have their own inherent limitations, or comprise extremely complex electronic circuitry.

*Object and drawings*

It is, therefore, the principal object of my invention to provide an improved electronic quantizer.

It is another object of my invention to provide a quantizer that converts carrier-suppressed modulated analog signals into digital signals; the digital signals comprising pulses that occur at a frequency in accordance with the amplitude of the envelope of the analog signal, while the terminals at which the digital signals appear are related to the phase of the input signal.

The attainment of these objects and others will be realized from the following specification, taken in conjunction with the single drawing, which is a schematic diagram of my invention.

*Synopsis*

Broadly speaking, my invention contemplates a circuit wherein the incoming carrier-suppressed modulated analog signal is treated in such a way that only its negative-going loops are used. A demodulator senses whether the negative-going loops are in phase with a reference signal or out of phase with the reference signal; and accordingly feeds these loops to different integrating circuits. When an integrating circuit develops voltage of a particular value, the circuitry produces a pulse.

In this way, a higher-magnitude analog signal produces more frequent pulses; while the phase of the analog signal determines which of the integrators are used, and thus determines the output terminal at which the digital signal appears.

*Detailed Description of the invention*

FIGURE 1 shows a reference signal 10 and a first input carrier-suppressed modulated analog signal 12. It will be seen that analog signal 12 is in phase with reference signal 10, since both of them increase and decrease in synchronism.

FIGURE 1 also shows a second input carrier-suppressed modulated analog signal 14. It will be seen that the second input signal 14 is out-of-phase compared with reference signal 10; i.e., second input signal 14 is decreasing (negative-going) at the times that reference signal 10 is increasing (positive-going), and is positive-going when the reference signal 10 is negative-going.

It may thus be seen that input signals 12 and 14 have opposite phases, or polarities; and it is desired for the circuitry to distinguish between input signals 12 and 14.

It will also be noted that input signals 12 and 14 have amplitudes that are different from each other, and different from the amplitude of the reference signal 10. Although it has not been shown, the amplitudes of the input signals 12 and 14 may also vary from moment to moment, and with respect to the other input signal.

It is desired that the amplitude of input signals 12 and 14 produce digital signals, or pulses, whose frequency of recurrence depends upon the magnitude of the envelope of the input signal.

FIGURE 1 shows an over-all schematic diagram of my invention. The input signal is applied to an input terminal 18, and is coupled to an amplifier 20. Amplifier 20 may take any suitable form, the illustrated one comprising a pair of cascaded transistors and a feedback connection that comprises oppositely pole diodes 22 and 24.

For low-amplitude signals, diodes 22 and 24 are not conductive, so that the feedback connection is disabled. As the amplitude of the input signal increases, the feedback connection becomes operative, and this changes the over-all response of the amplifier 20.

The output of amplifier 20 is applied to a phase discriminator 26. Phase discriminator 26 comprises an element such as transistor 28, that produces an output signal when one of the "loops" of the input signal is applied to it.

In the illustration, transistor 28 is of the PNP type, and becomes conductive for the negative-going loops of the input signal. Thus, when the negative-going loop of the amplified input signal is applied to transistor 28, a positive-going output is produced, and is applied to polarity-control diodes 30 and 32. These diodes assure that only positive-going signals are transmitted to the subsequent circuitry.

It is desirable that transistor 28 act as a high-impedance source that produces a substantially constant output current flow. The use of a PNP transistor in a commoncollector configuration, as illustrated, satisfies this requirement. Other types of transistors and configurations may be used.

I have found that the characteristics of transistor 28 are such that there is a slight possibility that it may transmit the unwanted negative-going signals from the amplifier, although in a severely attenuated form. Since I desire that no negative-going signals at all be transmitted, I use another transistor 34, shown as being of the NPN type, that assures the elimination of the undesired negative-going signal. The positive-going loop of the input signal causes transistor 34 to become conductive, which therefore conducts the unwanted negative-going signal to ground.

In this way transistor 34 produces a low-resistance path for the unwanted portion of the input signal, and thus assures that the unwanted signal will not be passed through transistor 28, or to subsequent circuitry.

In the presence of an in-phase input signal 12, the signals from the phase discriminator 26 take the form shown by reference character 36; whereas in the presence of out-of-phase input signal 14, the signals from phase discriminator 26 take the form shown by reference character 38. It will be seen that the in-phase input signal 12 produces an output signal having positive-going loops that occur simultaneously with the positive-going loops of reference signal 10; whereas out-of-phase input signal 14 produces output signals having positive-going loops that occur at times that are different from those of the in-phase input signal, and occur simultaneously with the negative-going loops of reference signal 10.

In this way, phase discriminator 26 produces output signals 36 and 38 that are discriminated in accordance with the phase of the input signals.

Assume for the moment that an in-phase input signal 12 is applied to terminal 18. The output of phase discriminator 26 is therefore of the form shown by waveform 36. This waveform 36 is applied to polarity-control diodes 30 and 32, which help assure that only positive-going signals are applied to demodulator 40. Demodulator 40 comprises a transformer 42 whose input winding 44 is energized by the reference signal 10.

Transformer 42 has two output windings 46 and 48, each supplying an individual closed loop that comprise switching diodes 52 and 54, and clipping diodes 56 and 57.

Demodulator 40 operates as follows. For the positive portion of the reference signal 10 applied across the terminals of winding 44, a voltage is generated across winding 46 which forward-biases switching diode 52 and makes it conductive. The voltage generated across winding 48 back-biases switching diode 54 and makes it non-conductive.

As a result, the output signal from phase discriminator 26 passes through polarity-control diode 30, through the forward-biased conductive switching diode 52, and through capacitor 58; thus charging the capacitor 58. This same output signal cannot pass through non-conductive switching diode 54.

Thus, every positive-going loop of waveform 36 passes through conductive switching diode 52, and adds an additional charge to capacitor 58—which thus performs a summing, or integrating, operation.

When an out-of-phase input signal 14 is applied to input terminal 18, the output of phase discriminator 26 takes the form of waveform 38. When this waveform is applied to polarity-control diodes 52 and 54, it finds, due to the reversal of the reference voltage 10, that switching diode 52 is back-biased, and therefore non-conductive; while switching diode 54 is forward-biased and conductive. The signal therefore passes through polarity-control diode 32, through conductive switching diode 54, and through capacitor 60; thus charging the capacitor 60.

Thus, an in-phase input signal charges capacitor 58; while an out-of-phase input signal charges capacitor 60. Improved charging characteristics are provided by the feedback circuit of the amplifier 20.

Clipping diodes 56 and 57 modify the waveform of electricity flowing through the closed loops, so that small incidental phase shifts of the waveforms 36 and 38 are nullified.

Assume for the moment that the input signal, of either phase, has a low magnitude. It therefore produces a relatively small-magnitude output signal such as 36 or 38, and therefore charges capacitor 58 or 60 very slowly.

If, on the other hand, the input signal applied to input terminal 18 has a high magnitude, it charges capacitor 58 or 60 at a very high rate.

It may thus be seen that a capacitor, 58 or 60, is charged by an input signal of a selected phase, and that the time at which the charge of the capacitor reaches a particular value is a function of the magnitude of the envelope of the input signal.

In order to convert the input signal to pulses, the pulse-forming circuit 62 is used. When the capacitor 58 or 60 reaches a predetermined value, it causes an element, such as a uni-junction transistor 64 or 66, to become conductive. This element discharges the capacitor, and produces a pulse at the element's output electrode. The capacitor is recharged in the previously described manner, so that the pulse-forming circuit produces a series, or train, of pulses at output terminals 70 and 72.

In this way the pulses produced by pulse-forming circuit 62 have a repetition rate that depends upon the rate at which the capacitor is charged; which in turn depends upon the magnitude of the input signal. Furthermore pulse-forming circuit 62 has two output channels; an in-phase signal causing a train of pulses to appear at one output channel, whereas an out-of-phase input signal causes a train of pulses to appear at the second output channel.

In those cases where the pulse-forming circuit 62 produces pulses that are not quite satisfactory as to pulse height, pulse width, or shape, the output of the pulse-forming circuit may be applied to a circuitry 68 that comprises devices such as blocking oscillators. These have the property that when energized by a suitable signal, they will produce a pulse having a desired amplitude, width, and shape.

By use of a blocking oscillator circuit 68, the output of pulse-forming circuit 62 can be converted to a train of pulses having the desired amplitude and duration; the pulses having a frequency of recurrence that depends upon the amplitude of the input signal.

As shown above, my invention converts input signals into a train of sharply defined pulses whose rate of recurrence depends upon the magnitude of the input signal, and the terminal at which the output signals appear is controlled by the phase of the input signal.

Although the invention has been described and illustrated in detail, it is to be understood that the same is by way of illustration and example only and is not to be taken by way of limitation, the spirit and scope of this invention being limited only by the terms of the appended claims.

I claim:

1. A circuit for converting analog input signals of different-phases into trains of output pulses whose repetition rate corresponds to the amplitude of the input signals, comprising:

phase-discriminator means for discriminating between the phases of said input signals, said discriminator means comprising an output element that acts as a high-impedance source of output signals;

demodulator means for demodulating the output of said phase discriminator means, said demodulator means comprising a pair of switching diodes;

means for applying a reference signal to said demodulator means for causing said switching diodes to become alternately conductive;

a pair of capacitors;

means for causing the different-phase output signals from said phase discriminator to be directed by said alternately conductive switching diodes to the one said capacitors that corresponds to a given phase of input signal; and means, comprising a pair of voltage-sensitive elements connected to respective capacitors, for producing a pulse when said capacitor accumulates a predetermined charge.

2. A circuit for converting analog input signals of different phases into trains of output pulses whose repetition rate corresponds to the amplitude of the input signals, said trains of pulses appearing at output terminals corresponding to the phase of the input signals, comprising:

an input terminal;

phase-discriminator means for discriminating between the phases of said input signals applied to said input terminal, said discriminator means comprising an output element that acts as a high-impedance constant-current source of output signals;

demodulator means for demodulating the output of said phase discriminator means, said demodulator means comprising a pair of switching diodes;

means for applying a reference signal to said demodulator means for causing said switching diodes to become alternately conductive;

a pair of capacitors;

means for causing the different-phase output signals from said phase discriminator to be directed by said alternately conductive switching diodes to the one said capacitors that corresponds to a given phase of input signal;

means, comprising a pair of voltage-sensitive elements connected to respective capacitors, for producing a pulse when said capacitor accumulates a predetermined charge; and output terminals connected to respective said pulse-producing means.

3. A circuit for converting analog input signals of different phases into trains of output pulses whose repetition rates correspond to the amplitude of the input signals, said trains of pulses appearing at output terminals corresponding to the phase of the input signals comprising:

an input terminal;

amplifier means, having an amplitude-sensitive feedback connection, for amplifying the input signals applied to said input terminal;

phase-discriminator means, energized by the output of said amplifier means, for discriminating between the phases of input signals applied to said input terminals, said discriminator means comprising an output element that acts as a high-impedance constant-current source of output signals;

demodulator means for demodulating the output of said phase discriminator means, said demodulator means comprising a pair of closed loops, each said closed loop comprising a switching diode;

means for causing a reference signal to cause said switching diodes to become alternately conductive;

a pair of capacitors;

means for causing the different-phased output signals from said phase discriminator to be directed by said alternately-conductive switching diodes to the one of said capacitors that corresponds to a given phase of input signal;

means, comprising a pair of voltage-sensitive elements connected to respective capacitors, for producing a pulse when said capacitor accumulates a predetermined charge; and means energized by said voltage-sensitive elements, for producing suitably-shaped pulses.

4. A circuit for converting analog input signals of different phases into trains of output pulses whose repetition rates correspond to the amplitude of the input signals, said trains of pulses appearing at output terminals corresponding to the phase of the input signals comprising:

an input terminal;

amplifier means, having an amplitude-sensitive feedback connection, for amplifying the input signals applied to said input terminal;

phase-discriminator means, energized by the output of said amplifier means, for discriminating between the phases of input signals applied to said input terminals, said discriminator means comprising an output element that acts as a high-impedance constant-current source of output signals, said discriminator means further comprising a second output element that discards signals of undesired polarity;

demodulator means for demodulating the output of said phase discriminator means, said demodulator means comprising a transformer having an input winding and two oppositely-poled output windings, individual closed loops connected to respective said output windings, each said closed loop comprising a switching diode and a clipping diode;

means for applying a reference signal to said input winding of said transformer for causing said switching diodes to become alternately conductive;

a pair of capacitors;

means for causing the different-phased output signals from said phase discriminator to the directed by said alternately conductive switching diodes to the one of said capacitors that corresponds to a given phase of input signal;

means, comprising a pair of voltage-sensitive elements connected to respective capacitors, for producing a pulse when said capacitor accumulates a predetermined charge;

means energized by said voltage-sensitive elements, for producing suitably-shaped pulses; and output terminals connected to respective said shaped-pulse-producing means.

5. In combination:

a pair of switching diodes;

a substantially constant frequency voltage source connected to cause one of said switching diodes to conduct during one half cycle of the voltage of said voltage source and to cause the second of said switching diode to conduct during the second half cycle of the voltage of said voltage source;

first and second capacitors, connected to different ones of said switching diodes, each adapted to be charged when the respective diode to which it is attached conducts; and first and second pulse producing means connected to produce pulses when said first and second capacitors, respectively, accumulate a predetermined charge.

6. In combination:

first and second switching diodes;

first and second capacitors connected to be charged by current flow through said first and second switching diodes, respectively;

a reference voltage source of substantially constant frequency, connected to cause said first switching diode to conduct only during a first half cycle of the voltage of said reference voltage source and to cause said second switching diode to conduct only during the second half cycle of the voltage of said reference voltage source;

half-wave rectifier means connected to deliver its output signal to said diodes to charge the respective said capacitors which is connected to the said switching diode that is conducting; and first and second means connected to said first and second capacitors, respectively to produce pulses when the said capacitor to which it is connected accumulates a predetermined charge.

7. In combination:

a reference voltage source of substantially constant frequency;

a first capacitor;

a first means for producing a pulse when said first capacitor accumulates a predetermined charge;

a second capacitor;
a second means for producing a pulse when said second capacitor accumulates a predetermined charge;
a phase discriminator means for generating a half-wave rectified signal which is in phase with signals applied to its input terminal;
a first switching diode connected to the output of said phase discriminator means and connected to be controlled by said reference voltage source to conduct current from the output terminal of said phase discriminator means to said first capacitor when the signal at the output of said phase discriminator means is in phase with a first half-wave of voltage from said reference voltage source;
a second switching diode connected to the output of phase discriminator means connected to be controlled by said reference voltage source to conduct current from the output of said phase discriminator means to charge said second capacitor when the signal at the output of said phase discriminator means is in phase with a second half-wave of voltage from said reference voltage source.

8. In combination:
phase-discriminator means for discriminating between the phases of its input signals;
demodulator means connected to demodulate the output of said phase discriminator means;
means for applying a reference signal to said demodulator means;
a pair of capacitors;
means for causing the different phase-output signals from said phase-discriminator to be directed by said demodulator to the one of said capacitors that corresponds to a given phase of input signal; and
means for producing a pulse when each of said capacitors accumulates a predetermined charge.

9. In combination:
an input terminal;
phase discriminator means for discriminating between the phases of input signals applied to said input terminal;
demodulator means for demodulating the output of said phase discriminator means;
means for applying a reference signal to said demodulator means;
a pair of capacitors;
means for causing the different-phase output signals from said phase discriminator to be directed by said demodulator means to the one of said capacitors that corresponds to a given phase of input signal;
means for producing pulses when each of said capacitors accumulates a predetermined charge; and
output terminals connected to said pulse producing means.

10. In combination:

an input terminal;
amplifier means for amplifying input signals applied to said input terminal;
phase discriminator means, energized by the output of said amplifier means, for discriminating between the phases of input signals applied to said input terminals;
demodulator means for demodulating the output of said phase discriminator means;
means for causing a reference signal, connected to control said demodulator means;
a pair of capacitors;
means for causing the different phased output signals from said phase discriminator to be directed by said demodulator to the one of said capacitors that correspond to a given phase of input signal;
means for producing a pulse when each of said capacitors accumulates a predetermined charge; and
means energized by said last named means for producing pulses of a predetermined shape.

11. In combination:
an input terminal;
amplifier means for amplifying the input signals applied to said input terminal;
phase discriminator means, energized by the output of said amplifier means, for discriminating between the phases of input signals to said input terminals, and further including means for discarding signals of a predetermined polarity;
demodulator means for demodulating the output of said phase discriminator means;
means for applying a reference signal to said demodulator means;
a pair of capacitors;
means for causing the different-phased output signals from said phase discriminator to be directed by said phase demodulator to the one of said capacitors that corresponds to a given phase of input signals;
first and second means connected to said first and said second capacitors for producing pulses when the said capacitor to which it is connected accumulates the predetermined charge;
means energized by said last named means for producing pulses of a predetermined shape; and
output terminals connected to said pulse shaping means.

References Cited by the Examiner

UNITED STATES PATENTS

| | | | |
|---|---|---|---|
| 3,025,418 | 3/62 | Brahm | 307—88.5 |
| 3,042,872 | 7/62 | Brahm | 307—88.5 X |
| 3,060,388 | 10/62 | Ball et al. | 307—88.5 X |
| 3,111,591 | 11/63 | Conron et al. | 307—88.5 |

ARTHUR GAUSS, *Primary Examiner.*